(12) United States Patent
Perry

(10) Patent No.: US 10,461,482 B1
(45) Date of Patent: Oct. 29, 2019

(54) ELECTRICALLY-CHARGED OUTLET

(71) Applicant: Robert Perry, West Deptford, NJ (US)

(72) Inventor: Robert Perry, West Deptford, NJ (US)

( * ) Notice: Subject to any disclaimer, the term of this patent is extended or adjusted under 35 U.S.C. 154(b) by 0 days.

(21) Appl. No.: 16/001,582

(22) Filed: Jun. 6, 2018

Related U.S. Application Data

(60) Provisional application No. 62/515,666, filed on Jun. 6, 2017.

(51) Int. Cl.
*H01R 25/00* (2006.01)
*H01R 13/42* (2006.01)

(52) U.S. Cl.
CPC ........... *H01R 25/006* (2013.01); *H01R 13/42* (2013.01)

(58) Field of Classification Search
CPC ............. H01R 25/006; H01R 13/6395; H01R 25/525; H01R 25/78
USPC ............................................. 439/535; 174/53
See application file for complete search history.

(56) References Cited

U.S. PATENT DOCUMENTS

| | | | | |
|---|---|---|---|---|
| 3,716,651 A * | 2/1973 | Werner | ................ | H01R 25/006 174/53 |
| 4,063,660 A * | 12/1977 | Ware | ...................... | H02G 3/123 174/58 |
| 6,201,187 B1 | 3/2001 | Burbine | | |
| 7,034,222 B1 * | 4/2006 | York | ........................ | H02G 3/16 174/50 |
| 7,090,530 B1 * | 8/2006 | Dibble | ................. | H01R 4/4827 439/441 |
| 7,754,967 B2 * | 7/2010 | Kruse | ...................... | H02G 3/22 174/481 |
| 8,235,748 B2 * | 8/2012 | Lacey | ...................... | H02G 3/18 439/502 |
| 9,325,131 B2 * | 4/2016 | Loose, Sr. | ............ | H01R 25/006 |
| 2006/0105626 A1 * | 5/2006 | Scott | .................... | H01R 9/2491 439/535 |
| 2008/0053698 A1 | 3/2008 | Purves et al. | | |
| 2008/0235943 A1 | 10/2008 | Gorman | | |
| 2009/0107693 A1 * | 4/2009 | Meyer | .................... | H02G 3/086 174/60 |
| 2009/0183891 A1 | 7/2009 | Kramer, Jr. | | |
| 2011/0180296 A1 | 7/2011 | Hellwig et al. | | |

* cited by examiner

*Primary Examiner* — Hien D Vu

(74) *Attorney, Agent, or Firm* — Cramer Patent & Design, PLLC; Aaron R. Cramer

(57) ABSTRACT

An outlet box in which the electrical supply is directed to slots located within the periphery of the box is provided. The slots are configured to allow positive, negative and ground connection screws of an outlet to merely occupy each respective slot to be in electrical communication with the electrical supply.

15 Claims, 3 Drawing Sheets

ELECTRICALLY-CHARGED OUTLET

RELATED APPLICATIONS

The present invention was first described in and claims the benefit of U.S. Provisional Patent Application No. 62/515,666 filed on Jun. 6, 2017, the entire disclosures of which are incorporated herein by reference.

FIELD OF THE INVENTION

The present invention relates generally to the field of an electrically-charged outlet assembly.

BACKGROUND OF THE INVENTION

Whether you are a do-it-yourself home improvement-type of individual or an experienced electrician, installing a new electrical outlet can often be taxing. The difficulty in large part resides in the inherent risk of electric shock or electrocution associated with working with electrical wiring. However, there are other difficulties which can make the installation or replacement of an electrical outlet less than easy prospect.

Often times, the spaces between an electrical outlet box and the new electrical outlet are so narrow that it becomes difficult for a given installer to easily connect the electrical wiring to the respective terminals of an electrical outlet. Additionally, removal of an old electrical outlet may be similarly difficult because of the tight fit of the electrical outlet within the box coupled with the low amount of play the electrical wiring, which is secured to the respective terminals, provides. In these circumstances removing and replacing an electrical outlet may prove frustrating and time consuming.

Some efforts to address these issues have been made in the form of U.S. Pat. Nos. 3,716,651, 6,945,815 and 6,361,333. However, these solutions are not satisfactory and often require the use of a specially configured electrical outlet box. Therefore, there is a need for an electrically charged outlet which permits the installation of a traditional electrical outlet in a manner that is safe, fast and affordable. The present invention fulfills this need.

SUMMARY OF THE INVENTION

To achieve the above and other objectives, the present invention provides for such an electrically charged outlet assembly, comprising an outlet box defining an interior and a front open face. The outlet box comprises a plurality of outlet box upper retaining apertures disposed upon a top side of the outlet box, a plurality of outlet box lower retaining apertures disposed on a bottom side of the outlet box, a first power wire aperture located on a first side of the outlet box, a second power wire aperture located on a second side of the outlet box, a third power wire aperture located on a third side of the outlet box, and a fourth power wire aperture is located on a fourth side of the outlet box.

The first power wire aperture, the second power wire aperture, the third power wire aperture and the fourth power wire aperture are designed to permit a power wire having a neutral wire, a hot wire and a ground wire to pass through the outlet box first side and the outlet box second side. The interior of the outlet box may be disposed against a rear face of the interior of the outlet box with a neutral wire terminal fastener, a hot wire terminal fastener, or a ground wire terminal fastener. The neutral wire terminal fastener may join opposing ends of the neutral wire, the hot wire terminal fastener may join opposing ends of the hot wire and the ground wire terminal fastener may join opposing ends of the ground wire.

A neutral terminal fastener slot may be secured within the outlet box and located against one interior outlet box wall, the neutral terminal fastener slot is in electrical communication with the neutral wire terminal fastener with a neutral bridge. A hot terminal fastener slot may be secured within the outlet box and located against one interior outlet box wall and adjacent the neutral terminal fastener slot, the hot terminal fastener slot is in electrical communication with the hot wire terminal fastener with a hot bridge.

A ground terminal fastener slot may be secured within the outlet box and located against one interior outlet box wall adjacent the neutral terminal fastener slot, the ground terminal fastener slot is in electrical communication with the ground wire terminal fastener with a ground bridge. Each of the slots may be shaped to permit a respective terminal outlet terminal fastener to removably reside therein and each of the slots includes a metallic clip which is in electrical communication with one of the power wires.

The metallic clip may be capable of transmitting an electrical charge while one of the power wires has been properly connected to the outlet box. When the power wire is electrified, a properly inserted electrical outlet is electrified. The electrical outlet may include a plurality of outlet upper retaining apertures above an upper outlet receptacle and a plurality of outlet lower retaining apertures below a lower outlet receptacle. The electrical outlet may also include a neutral outlet terminal fastener, a hot outlet terminal fastener and a ground outlet terminal fastener.

The electrical outlet will easily snap into the electrically charged outlet box without having to connect the power wires directly to the electrical outlet. If the electrical outlet should require replacement it is easily removed by pulling the electrical outlet out of the outlet box and inserting a new electrical outlet into the outlet box.

The electrically charged outlet may be made of plastic which has been manufactured by injection molding. The electrically charged outlet may also be made of steel which has been manufactured using a metal stamping process. The electrical outlet may be inserted into the outlet box by placing the neutral outlet terminal fastener into the neutral terminal fastener slot, by placing the hot outlet terminal fastener into the hot terminal fastener slot or by placing the ground outlet terminal fastener into the ground terminal fastener slot.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
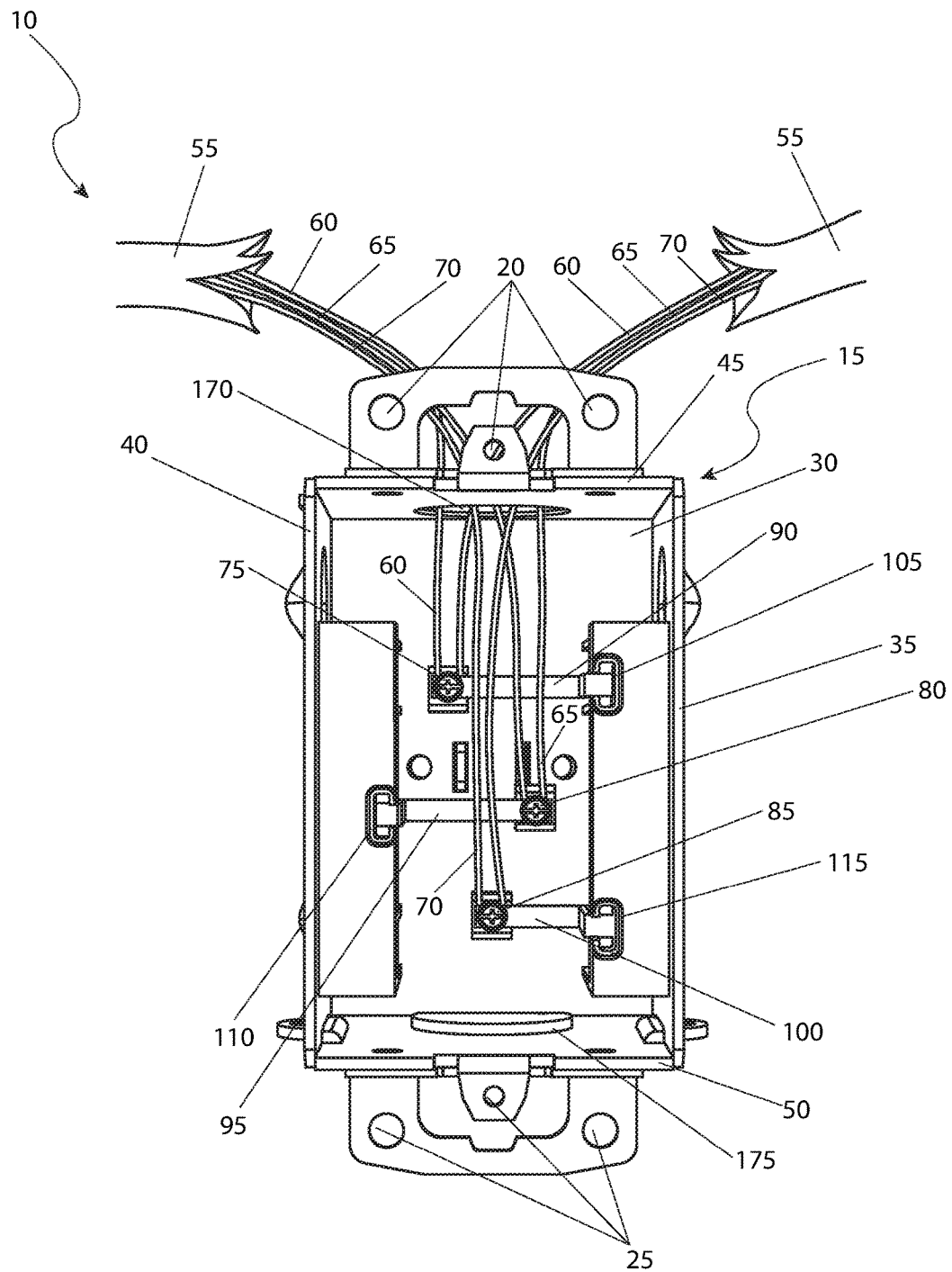
FIG. 1 is a front perspective view of an electrically charged outlet assembly 10, according to the preferred embodiment of the present invention.

10 electrically charged outlet assembly
15 outlet box 20 outlet box upper retaining aperture
25 outlet box lower retaining aperture
30 outlet box rear face
35 outlet box first side
40 outlet box second side
45 outlet box top side
50 outlet box bottom side
55 power wire
60 neutral wire
65 hot wire
70 ground wire
75 neutral wire terminal fastener
80 hot wire terminal fastener
85 ground wire terminal fastener
90 neutral bridge
95 hot bridge
100 ground bridge
105 neutral terminal fastener slot
110 hot terminal fastener slot
115 ground terminal fastener slot
120 outlet
125 neutral outlet terminal fastener
130 hot outlet terminal fastener
135 ground outlet terminal fastener
140 outlet upper retaining aperture
145 outlet lower retaining aperture
150 upper outlet receptacle
155 lower outlet receptacle
160 outlet box first power wire aperture
165 outlet box second power wire aperture
170 outlet box third power wire aperture
175 outlet box fourth power wire aperture

DETAILED DESCRIPTION OF THE PREFERRED EMBODIMENT

Figure 2:
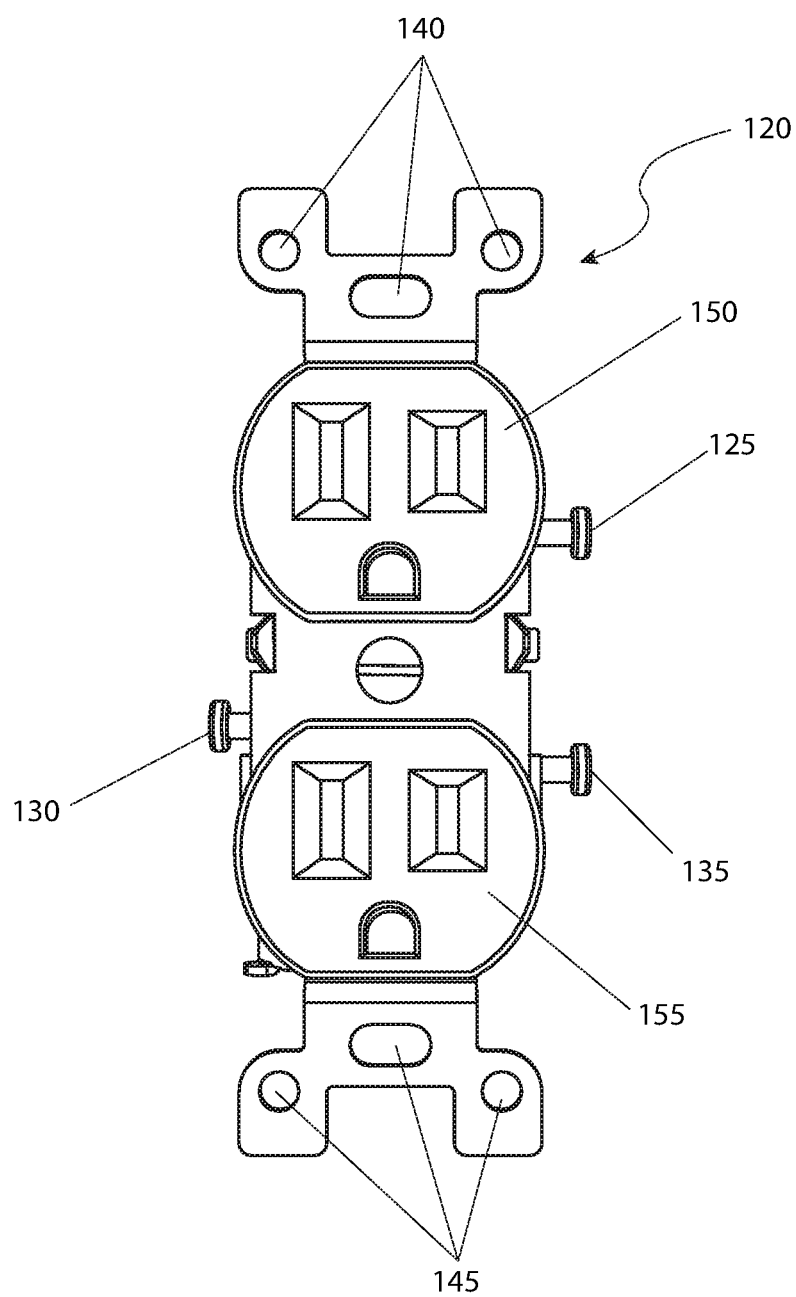
FIG. 2 is a front perspective view of a typical electrical outlet 120, according to the preferred embodiment of the present invention; and, FIG. 3 is a perspective view of a typical electrical outlet 120, in a pre-installation configuration with an outlet box 15.
Figure 3:
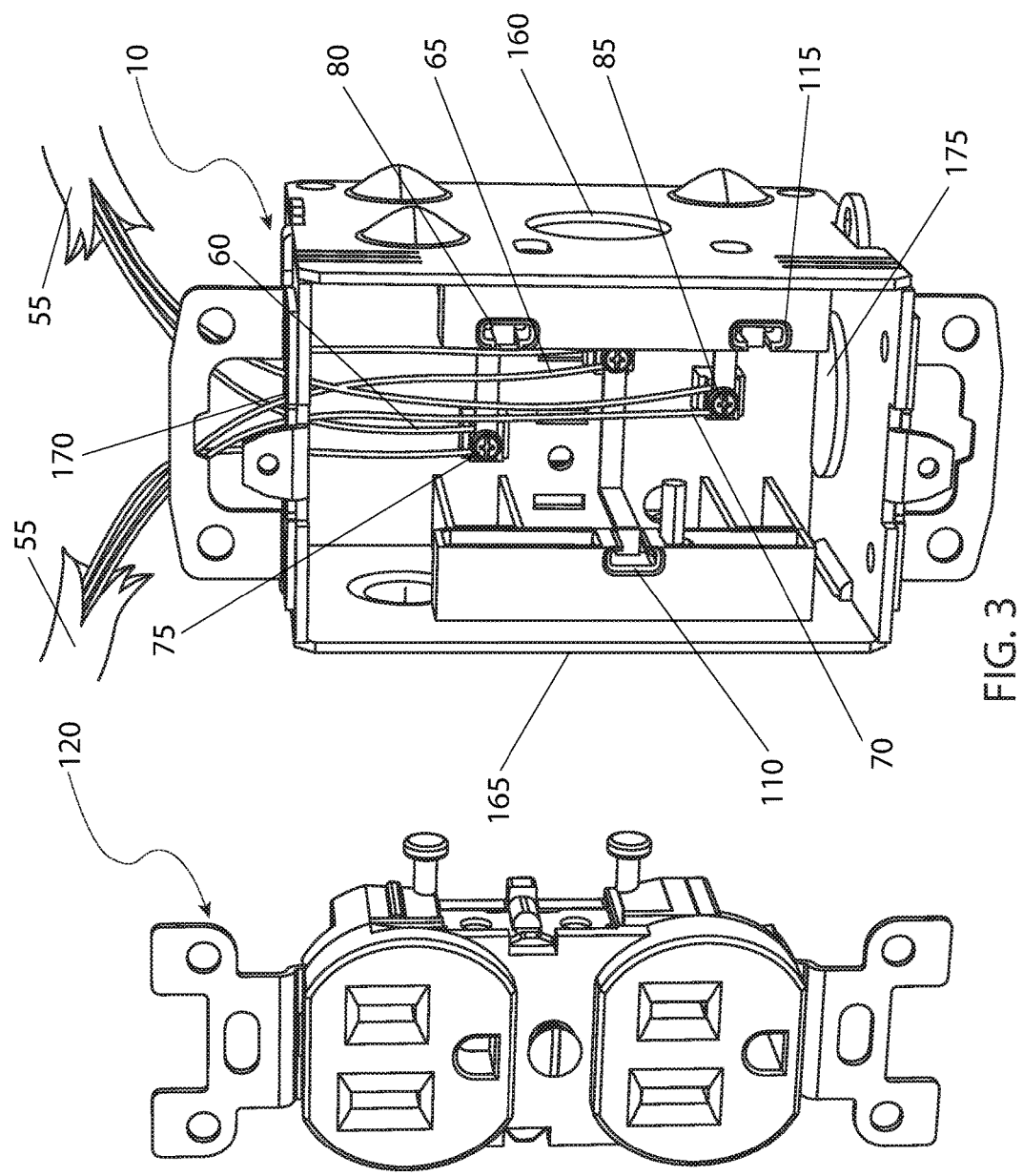

The best mode for carrying out the invention is presented in terms of its preferred embodiment, herein depicted within FIGS. 1 through 3. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope.

The terms "a" and "an" herein do not denote a limitation of quantity, but rather denote the presence of at least one (1) of the referenced items.

1. Detailed Description of the Figures

Referring now to FIG. 1, a front perspective view of an electrically charged outlet assembly 10, according to the preferred embodiment of the present invention is disclosed. The electrically charged outlet assembly 10, (herein described as the "assembly") 10, is preferably a rectangular shaped electrical outlet box 15 defining an interior and having a front open face. The outlet box 15 has a plurality of outlet box upper retaining apertures 20 disposed upon a top side of the outlet box 15 and a plurality of outlet box lower retaining apertures 25 disposed on a bottom side of the outlet box 15. An outlet box first power wire aperture 160 is located on a first side of the outlet box 15, a second power wire aperture 165 is located on a second side of the outlet box 15 (please see FIG. 3), a third power wire aperture 170 is located on a third side of the outlet box 15 and a fourth power wire aperture 175 is located on a fourth side of the outlet box. The first power wire aperture 160, the second power wire aperture 165, the third power wire aperture 170 and the fourth power wire aperture 175 are designed to permit a power wire 55 comprising a neutral wire 60 (typically sheathed in a white jacket), a hot wire 65 (typically sheathed in a black jacket) and a ground wire 70 (typically sheathed in a green jacket or rendered bare) to pass through the outlet box 15 first and second side and be electrically secured therein. Within the interior of the outlet box 15, disposed against a rear face, is a neutral wire terminal fastener 75, a hot wire terminal fastener 80, and a ground wire terminal fastener 85. The neutral wire terminal fastener 75 is configured to join opposing ends of the neutral wire 60. The hot wire terminal fastener 80 is configured to join opposing ends of the hot wire 65. The ground wire terminal fastener 85 is configured to join opposing ends of the ground wire 70.

A neutral terminal fastener slot 105 is secured within the outlet box 15 and located against one (1) interior outlet box 15 wall. The neutral terminal fastener slot 105 is in electrical communication with the neutral wire terminal fastener 75 with a neutral bridge 90. A hot terminal fastener slot 115 is secured within the outlet box 15 and located against one (1) interior outlet box 15 wall and adjacent the neutral terminal fastener slot 105. The hot terminal fastener slot 110 is in electrical communication with the hot wire terminal fastener 80 with a hot bridge 95. A ground terminal fastener slot 115 is secured within the outlet box 15 and located against one (1) interior outlet box 15 wall adjacent the neutral terminal fastener slot 105. The ground terminal fastener slot 115 is in electrical communication with the ground wire terminal fastener 85 with a ground bridge 100. Each slot 105, 110, 115 is shaped to permit a respective terminal outlet terminal fastener 125, 130 and 135 to removably reside therein. Each slot 105, 110 and 115 comprises a metallic clip which is in electrical communication with the power wire 55. Each metallic clip is capable of transmitting an electrical charge. When the power wire 55 has been properly connected to the outlet box 15 as described above and when the power wire 55 is electrified, a properly inserted electrical outlet 120 is likewise electrified without laborious and time-consuming installation of each respective line to each respective outlet terminal.

Referring now to FIG. 2, is a front perspective view of a typical electrical outlet 120, according to the preferred embodiment of the present invention. The typical electrical outlet 120 represents a configuration of which the assembly 10 is specifically designed to accommodate. The electrical outlet 120 comprises a plurality of outlet upper retaining aperture 140 above an upper outlet receptacle 150 and a plurality of outlet lower retaining aperture 145 below a lower outlet receptacle 155. The electrical outlet 120 also comprises a plurality of terminal fasteners i.e., a neutral outlet terminal fastener 125, a hot outlet terminal fastener 130 and a ground outlet terminal fastener 135. It is envisioned as discussed above that the electrical outlet 120 will easily snap into the assembly 10 without having to connect the power wires directly to the electrical outlet 120. Should the electrical outlet 120 require replacement it is easily removed by simply pulling the electrical outlet 120 out of the outlet box 15 and inserting a new electrical outlet 120 into the outlet box 15.

Referring now to FIG. 3, is a perspective view of a typical electrical outlet 120, in a pre-installation configuration with an outlet box 15. This view shows the manner in which an electrical outlet 120 may be inserted into the outlet box 15 by placing the neutral outlet terminal fastener 125 into the neutral terminal fastener slot 105, by placing the hot outlet terminal fastener 130 into the hot terminal fastener slot 110 and by placing the ground outlet terminal fastener 135 into the ground terminal fastener slot 115.

2. Operation of the Preferred Embodiment

The preferred embodiment of the present invention can be utilized by the common user in a simple and effortless manner with little or no training. It is envisioned that the assembly 10 would be constructed in general accordance with FIG. 1 and FIG. 3 and utilized in general accordance with FIG. 3.

The assembly 10 would be manufactured primarily of plastic and or steel, as aforementioned described, in an injection molding or metal stamping process respectively. To utilize the assembly 10, the outlet box 15 it is first installed within a wall having access to power wire 55 and installed at the respective terminal fasteners 75, 80 and 85. Once this is accomplished, a user may insert a traditionally configured electrical outlet 120 into the outlet box 15, thereby electrifying the outlet receptacles 150 and 155. The assembly 10 may be secured to a portion of a wall or mounting surface by means of the retaining aperture 20, 25. The electrical outlet 120 may be secured in place within the outlet box 15 with fasteners through the outlet retaining aperture 140, 145.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. An electrically charged outlet assembly, comprising:
   an outlet box defining an interior and a front open face comprising:
      a plurality of outlet box upper retaining apertures disposed upon a top side of said outlet box;
      a plurality of outlet box lower retaining apertures disposed on a bottom side of said outlet box;
      a first power wire aperture located on a first side of said outlet box;
      a second power wire aperture located on a second side of said outlet box;
      a third power wire aperture located on a third side of said outlet box; and
      a fourth power wire aperture is located on a fourth side of said outlet box;
      wherein within said interior of said outlet box is disposed against a rear face of said interior of said outlet box with a neutral wire terminal fastener, a hot wire terminal fastener, or a ground wire terminal fastener;
      further comprising a ground terminal fastener slot secured within said outlet box and located against one interior outlet box wall adjacent said neutral terminal fastener slot, said ground terminal fastener slot is in electrical communication with said ground wire terminal fastener with a ground bridge;
      wherein each of said slots are shaped to permit a respective terminal outlet terminal fastener to removably reside therein and each of said slots includes a metallic clip which is in electrical communication with one of a plurality of power wires; and
      wherein said metallic clip is capable of transmitting an electrical charge.

2. The electrically charged outlet assembly according to claim 1, wherein said first power wire aperture, said second power wire aperture, said third power wire aperture and said fourth power wire aperture are designed to permit a power wire having a neutral wire, a hot wire and a ground wire to pass through said outlet box first side and said outlet box second side.

3. The electrically charged outlet assembly according to claim 1, wherein said neutral wire terminal fastener joins opposing ends of said neutral wire, said hot wire terminal fastener joins opposing ends of said hot wire and said ground wire terminal fastener joins opposing ends of said ground wire.

4. The electrically charged outlet assembly according to claim 1, further comprising a neutral terminal fastener slot secured within said outlet box and located against one interior outlet box wall, said neutral terminal fastener slot is in electrical communication with said individually neutral wire terminal fastener with a neutral bridge.

5. The electrically charged outlet assembly according to claim 1, further comprising a hot terminal fastener slot secured within said outlet box and located against one interior outlet box wall and adjacent said neutral terminal fastener slot, said hot terminal fastener slot is in electrical communication with said hot wire terminal fastener with a hot bridge.

6. The electrically charged outlet assembly according to claim 1, wherein one of said power wires has been properly connected to said outlet box.

7. The electrically charged outlet assembly according to claim 6, wherein when said power wire is electrified and a properly inserted electrical outlet is electrified.

8. The electrically charged outlet assembly according to claim 7, wherein said electrical outlet includes a plurality of outlet upper retaining apertures above an upper outlet receptacle and a plurality of outlet lower retaining apertures below a lower outlet receptacle.

9. The electrically charged outlet assembly according to claim 7, wherein said electrical outlet includes a neutral outlet terminal fastener, a hot outlet terminal fastener and a ground outlet terminal fastener.

10. The electrically charged outlet assembly according to claim 7, wherein said electrical outlet snap-fits into said electrically charged outlet assembly without having to connect said power wires directly to said electrical outlet.

11. The electrically charged outlet assembly according to claim 7, wherein when said electrical outlet requires replacement when removed by pulling said electrical outlet out of said outlet box and inserting a new electrical outlet into said outlet box.

12. The electrically charged outlet assembly according to claim 1, wherein said electrically charged outlet assembly is made of plastic.

13. The electrically charged outlet assembly according to claim 12, wherein said electrically charged outlet assembly is made of plastic in an injection molding process.

14. The electrically charged outlet assembly according to claim 1, wherein said electrically charged outlet assembly is made of steel.

15. The electrically charged outlet assembly according to claim 14, wherein said electrically charged outlet assembly is made of steel in a metal stamping process.

\* \* \* \* \*